G. HUMPHRIES.
MOP WRINGER.
APPLICATION FILED SEPT. 8, 1914.
1,138,570. Patented May 4, 1915.
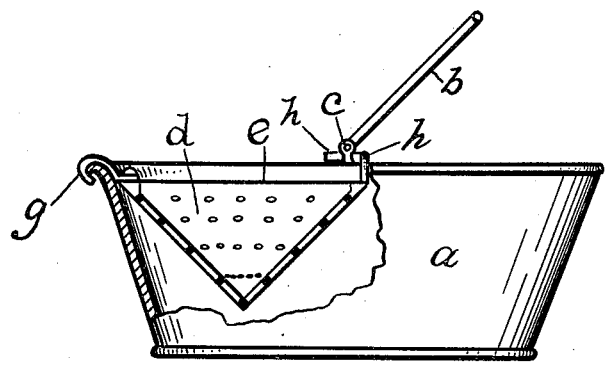
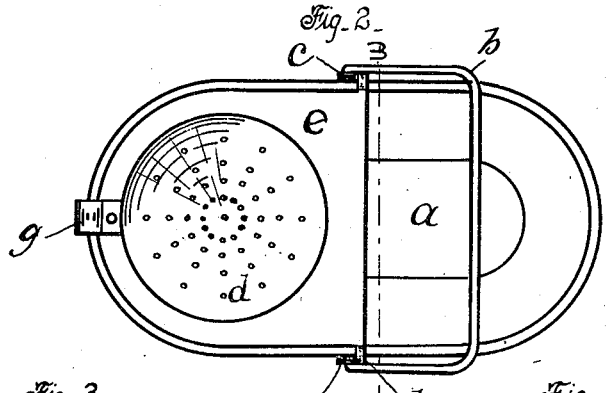
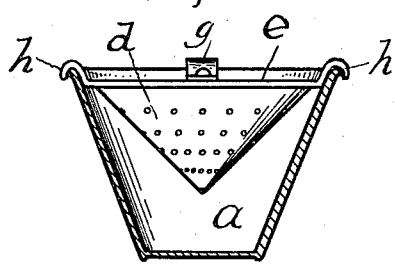
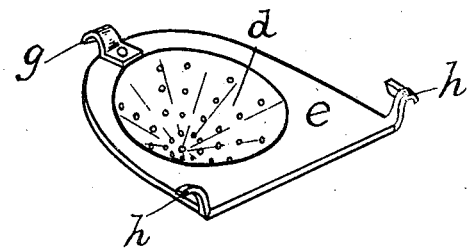
WITNESSES:
INVENTOR
George Humphries
BY Allen & Daggett
ATTORNEYS.

UNITED STATES PATENT OFFICE.

GEORGE HUMPHRIES, OF BOSTON, MASSACHUSETTS.

MOP-WRINGER.

1,138,570.  Specification of Letters Patent.  Patented May 4, 1915.

Application filed September 8, 1914. Serial No. 860,504.

*To all whom it may concern:*

Be it known that I, GEORGE HUMPHRIES, a citizen of the United States, residing at Boston, in the county of Suffolk, in the State of Massachusetts, have invented a certain new and useful Improvement in Mop-Wringers, of which the following is a specification, reference being had to the accompanying drawings.

The object of my said invention is to provide convenient, and inexpensive, means for wringing mops of the class shown and described in Patent No. 1,092,770 issued to me April 7th 1914, and my present improvements are embodied in a wringer of the perforated cone type which is removably mounted on a suitable pail, or other receptacle.

Briefly described, my said improvements consist in means for effectively suspending and locating the wringer proper within the pail, so that it (the wringer) when in service is practically a rigid part of the pail, but may be instantly detached from the pail, if desired, without removing nuts, bolts or screws, and without the aid of tools.

In order to explain my invention clearly I have provided the annexed drawings, in which—

Figure 1 is a side elevation of a receptacle having mounted thereon, by my improved means, a cone-shaped wringer; the side wall of said receptacle being partly broken away to disclose the said wringer. Fig. 2 is a plan view of the said receptacle and wringer. Fig. 3 is a transverse, vertical, sectional view taken on the line 3—3 of said Fig. 2. Fig. 4 is a perspective view of the wringer proper.

Referring to these drawings, the letter *a* indicates the receptacle of pail form, having a bail *b* which is hinged to the said receptacle by means of ears *c* of the usual type.

Suspended within one end portion of the receptacle *a* is a depending, perforated, cone *d* whose upper face, or plate portion *e* is located somewhat below the top of the receptacle, so that, during the operation of wringing a mop, any water that may drop upon the plate *e* will not overflow the top of the receptacle *a*, but will drain from said plate into the cone *d*, or directly into the receptacle *a;* the said plate being pitched slightly downward, toward the open portion of the said receptacle, as seen in Fig. 1 of the drawings. The cone *d* is detachably suspended in receptacle *a* by means of one or more hooks *g* adapted to fit over the end of the receptacle, and by oppositely located wire hooks *h* that are so shaped as to not only hook over the sides of the receptacle just forward of the ears *c*, but also to loop around said ears, as is perhaps best seen in Fig. 2 of the drawings and in the detached, perspective view of one of said hooks, in Fig. 4; thus serving to suspend the wringer at the desired height and level within the receptacle, and also to prevent endwise displacement of the wringer with respect to the receptacle, yet the wringer may be readily separated from the receptacle.

By means of a wringer of the improved construction described, the mop may be wrung by inserting the mop head in the cone *d* and giving a circular movement to said head, under pressure, and with no danger of disarranging the wringer or of accidentally detaching it from the pail *a*, and with no danger of having the water thus wrung from the mop head overflow the top of the pail.

Having thus described my invention, I claim as new and wish to secure by Letters Patent:—

As an improved article of manufacture, a mop wringer comprising a perforated cone-shaped member, a plate portion from which said member depends, said plate being provided at one end with a hook to engage over the upper edge of a receptacle, and at the opposite ends at the corners with oppositely located hooks having portions to engage over the sides of the receptacle, and portions at substantially right angles thereto to loop around the ears of a receptacle.

Signed at Boston, Massachusetts, U. S. A., August 29, 1914.

GEORGE HUMPHRIES.

In presence of—
FRANK H. ALLEN,
DOROTHY A. GÖERER.